United States Patent
Lothberg et al.

(10) Patent No.: US 7,596,146 B2
(45) Date of Patent: Sep. 29, 2009

(54) METHOD FOR UNIVERSAL TRANSPORT ENCAPSULATION FOR INTERNET PROTOCOL NETWORK COMMUNICATIONS

(75) Inventors: L. Peter J. Lothberg, Stockholm (SE); Anthony J. Bates, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 630 days.

(21) Appl. No.: 10/958,122

(22) Filed: Oct. 4, 2004

(65) Prior Publication Data

US 2005/0058136 A1 Mar. 17, 2005

Related U.S. Application Data

(63) Continuation of application No. 09/400,790, filed on Sep. 21, 1999, now Pat. No. 6,804,776.

(51) Int. Cl.
*H04L 12/56* (2006.01)
*H04L 29/06* (2006.01)
*H04J 3/24* (2006.01)

(52) U.S. Cl. .................. 370/401; 370/466; 370/474; 713/160

(58) Field of Classification Search .................. None
See application file for complete search history.

(56) References Cited

U.S. PATENT DOCUMENTS 6,094,437 A * 7/2000 Loehndorf et al. .......... 370/420
6,097,720 A * 8/2000 Araujo et al. .............. 370/355
6,118,785 A * 9/2000 Araujo et al. .............. 370/401
6,377,571 B1 * 4/2002 Tai ......................... 370/355
6,434,156 B1 * 8/2002 Yeh .......................... 370/401
6,496,867 B1 * 12/2002 Beser et al. ................ 709/245

* cited by examiner

*Primary Examiner*—Wing F Chan
*Assistant Examiner*—Marcus R Smith
(74) *Attorney, Agent, or Firm*—Campbell Stephenson LLP

(57) ABSTRACT

A method for implementing a simple protocol, referred to as the universal transport interface (UTI), that can be used to create high speed Internet Protocol (IP) tunnels for transmitting a variety of different payloads across a network. Payload packets may comprise any currently known packet protocol, including but not limited to time division multiplex data, IP packets, asynchronous transfer mode (ATM) cells, Packet-over-SONET/SDH (POS) packets, and Frame Relay frames. The universal transport interface protocol consists of a predefined set of mappings whereby any known protocol can be packaged into a single, conceptually simple packet format. This format is referred to as the universal transport encapsulation (UTE) format. UTE format packets are, by design, amenable to transport over an IP network without further modification beyond standard IP encapsulation. The disclosed method further implements a security key system to prevent unauthorized use or interception of UTE packets on the network.

36 Claims, 3 Drawing Sheets

METHOD FOR UNIVERSAL TRANSPORT ENCAPSULATION FOR INTERNET PROTOCOL NETWORK COMMUNICATIONS

CROSS-REFERENCE TO RELATED APPLICATIONS

This application is a continuation of U.S. patent application Ser. No. 09/400,790, entitled "Method for Universal Transport Encapsulation for Internet Protocol Network Communications," filed Sep. 21, 1999, now U.S. Pat. No. 6,804,776 and naming L. Peter J. Lothberg and Anthony J. Bates as inventors.

BACKGROUND OF THE INVENTION

1. Field of the Invention

The present invention relates to communications protocols, specifically packet encapsulation protocols for use in network communications.

2. Description of the Related Art

The global computer network, known today in one form as the "Internet," consists of a large installed base of many types of switches, routers and other equipment and software employing multiple communications protocols. Among these is the well-known Internet Protocol (IP), which is a connectionless communications protocol that provides, among other things, transport services for packetized data. The Internet Protocol is described in Karanjit S. Siyan, *Inside TCP/IP*, New Riders Publishing 1997, incorporated herein by reference in its entirety. Networks relying on connection-oriented protocols, such as Frame Relay or Asynchronous Transfer Mode (ATM), are also currently installed. There is a generally recognized need to provide fast, efficient, and inexpensive data communications to users regardless of the form of the network and the protocols currently installed.

One problem seen among users of so-called "legacy" systems, for example the older time division multiplex (TDM), Frame Relay, and ATM connection-oriented systems, is the relative lack of compatibility with modern network elements that use IP. Many legacy ATM and Frame Relay networks are unable to inexpensively connect to IP networks while providing the speed and bandwidth required by their users.

One potential solution to this problem is the virtual private network (VPN). A virtual private network consists of a closed user group (CUG) that communicates across a backbone network. The backbone provides service isolation and security from other CUGs. The backbone network can be any type of physical network, such as the global Internet, a private extranet, or campus intranet. To the users within the CUG, each is connected to the others as if the backbone did not exist. In essence, the VPN allow a network manager with an installed base of networking equipment to provide seamless transport for users without revealing the types of underlying network protocols used to furnish that transport. However, existing protocols and methods of connecting CUG members on legacy systems are still subject to the above-noted problems of a lack of speed and bandwidth due to shortfalls in the legacy protocols themselves.

Another option known in the art is providing virtual path trunking using an IPX protocol "tunnel" through an existing Internet Protocol network. The process whereby a virtual path protocol establishes a tunnel is called "tunneling." "Tunneling" generally refers to a user-transparent transport method of encapsulating one data form (the "payload," in this case IPX packets) within another packet protocol (here, IP) so that the payload data can pass across the IP network. One form of tunneling, known as generic routing encapsulation (GRE), is described in Internet Requests For Comments (RFCs) 1701 and 1702, available on the Internet at the URL http://www.ietf.org/rfc.html, incorporated herein by reference in their entireties.

While methods such as GRE are known in the prior art, the complexities of these systems do not approach the wide applicability currently desired by users. Current tunneling schemes are computation-intensive, slow, and increase the complexity of the IP network itself. Additional shortcomings are a lack of sufficient security at the ingress and egress interfaces of the virtual circuit tunnel. Also, the GRE protocol (in particular) is not viewed as amenable to ultra-high speed processing.

What is needed is an inexpensive, flexible, and user-transparent method of providing virtual path communications for users employing any protocol currently known or conceivable. Furthermore, what is needed is a system that has no effect on the existing IP network carrying this system.

SUMMARY

Presently disclosed is a method for implementing a simple protocol, referred to as the universal transport interface (UTI), that can be used to create high speed Internet Protocol (IP) tunnels through a network for carrying a variety of different payloads. These payload packets may comprise any currently known packet protocol, including but not limited to IP packets, asynchronous transfer mode (ATM) cells, Packet-over-SONET/SDH (POS) packets, and Frame Relay frames. The universal transport interface protocol consists of a predefined set of encapsulations (or "mappings") whereby any previously known protocol can be transformed into a universal transport encapsulation (UTE) packet format. UTE format packets are, by design, amenable to transport over an IP network without further modification beyond standard IP encapsulation. In this fashion, the UTI protocol creates a tunnel through an existing network that connects two user networks operating on a different protocol. A tunnel security key system prevents unauthorized use or interception of UTE packets on the network.

The UTI method, according to one embodiment of the present invention, comprises identification of the protocol used in the payload packet and determining the mapping function needed, if any, to translate the payload packet field ordering into the UTE format. This work is performed at the ingress interface to the UTI tunnel. The ingress interface device (e.g., a router) then performs a translation mapping on the payload packet and prepends the UTE header to the reformed packet. A tunnel security key that enables verification and validation of packet data sent through the UTI tunnel is included in the UTE header. On receipt of the transport packet thus conveyed through the tunnel, the receiving (egress) interface device validates the packet, strips off the UTE header, and reverses the mapping process. The reconstituted payload packet is then available for further routing within the receiving user network.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Overview

The present invention is a method of providing a universal transport interface (UTI) protocol utilizing a packet mapping called the universal transport encapsulation (UTE). By using the UTI protocol, network administrators can create high-speed tunnels through existing IP networks capable of carrying a wide variety of payload packets. UTI can be used to encapsulate most forms of non-IP packetized legacy data traffic efficiently and with minimal complexity, thereby providing a flexible, user-transparent virtual connection for legacy users.

Figure 1:
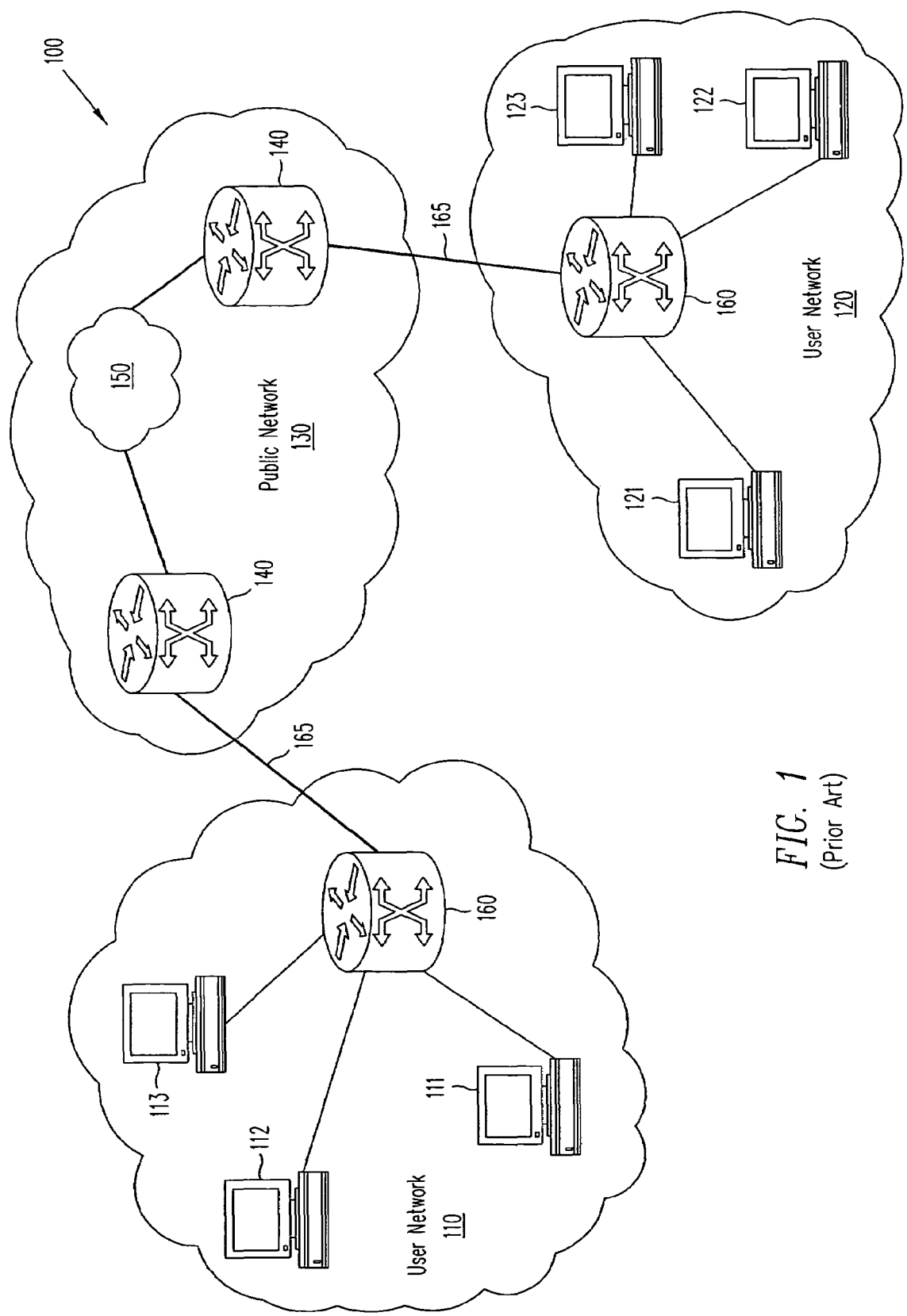
FIG. 1 is a high level schematic representation of a prior art IP network.

FIG. 1 shows a prior art data communications network 100. Users 111, 112, and 113 are connected as part of self-contained user network 110. Likewise, users 121, 122, and 123 are connected as part of another self-contained user network 120. User networks 110 and 120 are connected to each other by means of public network 130, itself composed of two or more routers 140 connected by network cloud 150.

Public network 130 (and network cloud 150 within it) is, in one embodiment of the present invention, the Internet. However, the present invention is not limited in its application to networks of global scope such as the Internet. Public network 130 and/or network cloud 150 thus may comprise a wide area network (WAN), a metropolitan area network (MAN), a extranet, or an intranet, as these terms are known in the art. Indeed, "public" network 130 need not be public at all—it only needs to be external to user networks 110 and 120 such that communications through network 130 are necessary for user networks 110 and 120 to talk to each other.

User networks 110 and 120 each comprise at least one edge router 160. Edge router 160 connects the user network (110 or 120) to public network 130 through backbone connection 165. For simplicity, user networks 110 and 120 are shown as having only three users each: 111, 112, 113 and 121, 122, 123, respectively. However, one skilled in the art will appreciate that user networks 110 and 120 could easily contain hundreds of users and numerous intra-network communications devices such as hubs, bridges, routers, and the like. Accordingly, the present invention is not limited to user networks of any particular size or complexity.

User networks 110 and 120 may generally operate on legacy systems, defined here to mean any network equipment communicating over a protocol other than the Internet Protocol (IP), such as ATM or Packet-Over-SONET (POS). As discussed above, these legacy systems are not directly compatible with the IP-based public network 130. Today, IP version 4 (IPv4) is the most widely used standard; public network 130 is here understood to be an IP-based network. However, IP version 6 (IPv6) is actively being developed, as are follow-on and alternate protocols. While the examples to follow are based solely on the IPv4 protocol, the present invention is in no way limited to IPv4.

Figure 2:
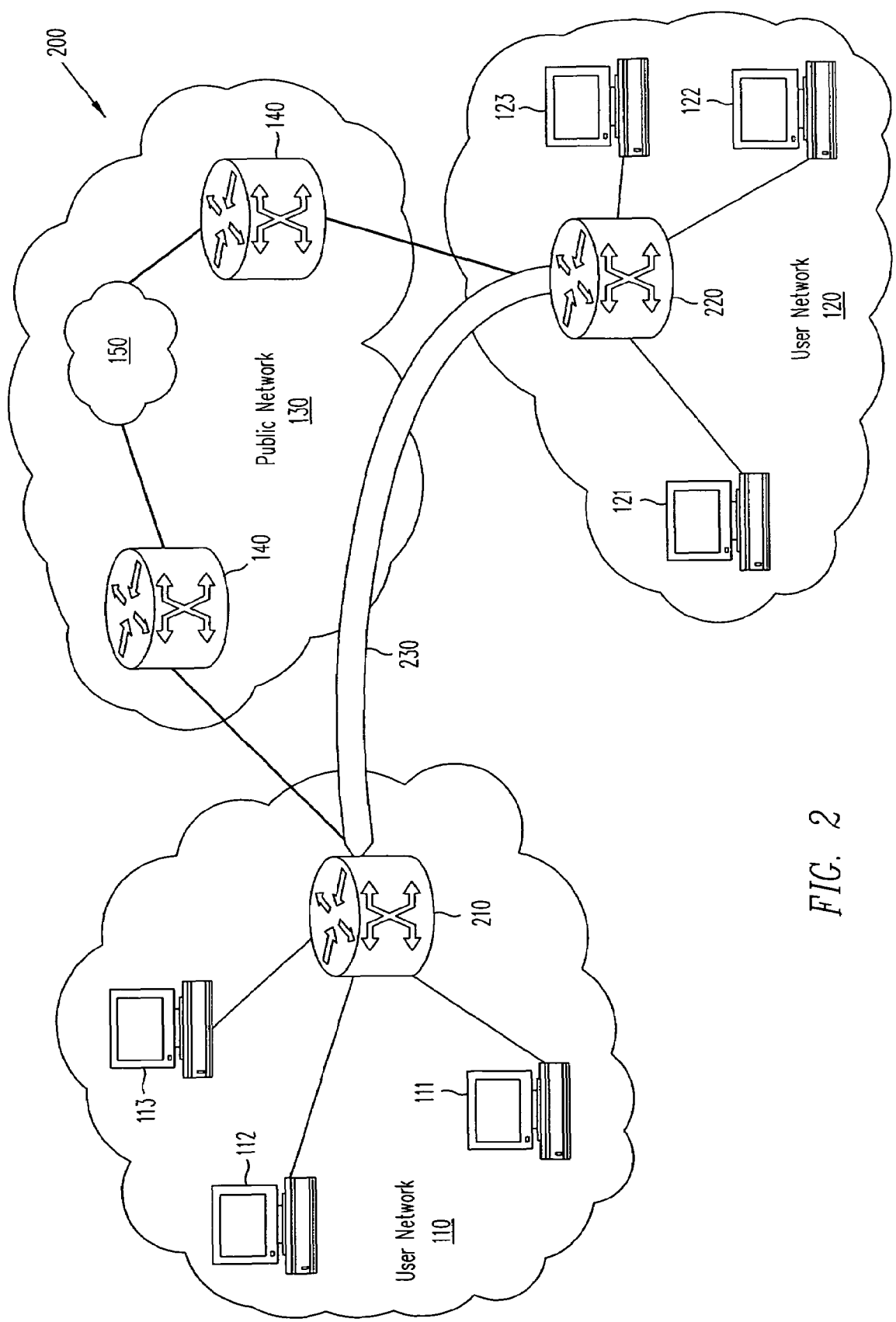
FIG. 2 is a high level schematic of an IP network containing a virtual path (or "tunnel") created according to one embodiment of the present invention.

Referring to FIG. 2, the ingress interface (II) is formed by edge router 210 in user network 110 (assuming, for purposes of illustration only, a single connection from user network 110 to user network 120). The ingress point or ingress interface is the point at which UTI tunnel 230 begins. Packets transit IP network 130 through virtual tunnel 230 simply because the IP protocol carries the packets unchanged through whatever switches, routers, and physical media (e.g., routers 140 and network cloud 150) the IP network contains. Payload source and destination addresses for the ingress interface and egress interface, respectively, are carried in the well-known IP header formed at the tunnel ingress by standard means known in the art.

The universal transport interface (UTI) protocol operates by encapsulating a payload packet, such as ATM cells, POS frames, or Frame Relay frames, within a UTE-formatted packet (the "transport packet") suitable for transmission by means of the well-known Internet Protocol. Encapsulation (also referred to as packet mapping) is accomplished by prepending a special header onto the payload packet.

In one embodiment, the payload packet itself remains unchanged within the UTE packet; a UTE header is merely added to the front of the payload. The mapping function applied to the payload packet is identical to the mapping applied to the transport packet to restore it, namely a 1:1 transcription of all fields without re-ordering. Alternatively, the order of fields in the payload packets may be re-arranged according to a mapping function; in such case the inverse mapping function is used at the egress interface to re-assemble the payload packet.

Universal transport encapsulation is a fixed-field approach to encapsulation, in contrast to the variable field lengths required by generic routing encapsulation (GRE). All fields in the UTE header are pre-defined and have known, preset lengths as described above. The payload packet encapsulation does not change the length of any payload packet field or perform additional calculations on the data, thus reducing the throughput speed penalties associated with such additional processing.

UTI tunnel 230 exits the IP network at the egress interface (EI) 220. The IP encapsulation is there stripped off by means well-known in the art. The UTE header is read and its security key evaluated as discussed further below. If the security key is correct, the UTI encapsulation is stripped off the payload and the contents of the transport packet are mapped back into payload packet format by the inverse of the mapping used at the II end. The payload packet is then presented to destination user network 120 in its original form, i.e., the format that first entered ingress interface 210 in user network 110.

The universal transport interface protocol has the additional advantage of being able to support differential quality of service (QoS) handling per UTI tunnel. Such service tailoring can be accomplished on the IP packets within the tunnel by means well-known in the art using the Type of Service field (or diffserv field, as it is known in some circles) in the IP header.

UTE Implementation

The UTE header consists, in one embodiment of the present invention, of a 64 bit tunnel key (in two 32 bit words) that provides a relatively high level of security and a third 32 bit word comprised of a 16-bit UTE packet length field, an 8 bit UTE protocol identifier (PID) field, and 8 reserved bits. These elements of the UTE header are shown in the table below and further described in succeeding paragraphs.

```
                       1               2               3
 0           7         5               3               1
+-+-+-+-+-+-+-+-+-+-+-+-+-+-+-+-+-+-+-+-+-+-+-+-+-+-+-+-+-+-+-+-+
|                          Tunnel Key                           |
|                           (64 bits)                           |
|      UTI Length       |      PID      |      Rsrvd            |
+-+-+-+-+-+-+-+-+-+-+-+-+-+-+-+-+-+-+-+-+-+-+-+-+-+-+-+-+-+-+-+-+
```

The tunnel key is an eight octet (eight 8 bit bytes, totaling 64 bits) security code or signature which is shared between the two endpoints (i.e., the ingress and egress interfaces, II and EI) of tunnel 230. The key is generated by any of number of encryption and/or digital signature means well-known in the art, such as the Data encryption Standard (DES) or PGP (Pretty Good Privacy) by Network Associates, Inc., of Santa Clara, Calif. In one embodiment of the present invention, a pseudo-random number generator is used to generate key sequences known to both ends of the tunnel.

External distribution and management of keys is likewise accomplished by means outside the scope of the present invention.

The key received at the egress interface is checked against that expected by the EI receiving router (edge router 220 in the example of FIG. 2). Since both edge routers 210 and 220 share the same key, and that key is unknown to others, only those UTE packets containing the proper sender key (i.e., the key expected from edge router 210 at the ingress interface) are considered "valid." In the event of receipt of an invalid UTE packet, such as one with an unknown, unexpected, or illegal key, the EI router 220 will drop the packet, according to one embodiment of the present invention.

In an alternate embodiment of the present invention, the EI router 220 also sends an alert message to a network administrator, such as the person responsible for user network 120 or user network 110. In a still further embodiment, the payload packet within the UTE packet is marked by means well-known in the art as "suspect" or "possibly corrupted" and re-routed to a special destination address for additional processing.

This mechanism provides for an extended level of security in order to prevent hacking or spoofing of a UTI tunnel by malicious entities relative to other tunneling schemes such as generic routing encapsulation (GRE).

Note that while a key length of 64 bits is disclosed, one of ordinary skill in the art will recognize that key signatures of any length can provide a level of security. Accordingly, the present invention is not limited to tunnel keys of any particular length.

The UTE Packet Length Field represents the overall length of the UTE packet in octets, including the payload packet and the UTE header.

The UTE Protocol Identifier (PID) is a unique field designating the protocol of the payload packet. PIDs are defined as pre-arranged configuration parameters, according to one embodiment of the present invention, as shown in the following table. These configuration parameters are loaded into routers 210 and 220 at system initialization and configuration. Ingress interface router 210 identifies the corresponding PID code to insert into the UTE header when presented with a payload packet for transport over tunnel 230. Identification of payload packet protocol is accomplished by means well-known in the art based on protocol identification data in the payload packet header. Additional PIDs can be defined as required.

| PID | Payload Protocol | Notes |
| --- | --- | --- |
| 0x00 | Raw payload | no mapping used |
| 0x01 | ATM | if UTI Length is 0, assume single cell |
| 0x02 | HDLC | |
| 0x03 | Frame Relay | |
| 0x04 | POS | |
| 0x05-0x07 | Reserved | |
| 0x08 | IP | |
| 0x09-0xEF | Reserved | |
| 0xF0-0xFF | Reserved for vendors | for protocols as yet undefined |

While having a PID is useful from a debugging standpoint, it is not completely necessary. Accordingly, in an alternate embodiment of the present invention, the PID is omitted in favor of a single pre-arranged configuration parameter in both II edge router 210 and EI edge router 220 that specifies the protocol of all payload packets to be transported through tunnel 230.

In a still further alternate embodiment, the PID is determined solely by local agreement or negotiation between the parties managing the ingress and egress interfaces. Such persons may include the respective Systems Administrators or the management of the company utilizing UTI.

The UTE-encapsulated payload packet is itself encapsulated using the Internet Protocol at the ingress interface to IP network 130. Internet Protocol encapsulation is accomplished in router 210 by means well-known in the art, employing the equally well-known IP header with certain settings specific to UTI. For instance, the upper level protocol octet is set to the Internet Assigned Number for UTI, currently "120" (decimal).

The universal transport interface does not support packet options, so the options field in the IP header is not used. (Any options found within the payload packet are sent unchanged.) Likewise, UTI does not fragment packets, so the IP fragment flags and offset field are not used. Any payload fragment packets received at the ingress interface are treated as if they are whole packets, encapsulated by UTE and sent through tunnel 230 as any other packet.

The IP time-to-live (TTL) field must be set at the ingress interface to be larger than the expected diameter of tunnel 230 through public network 130, including II and EI processing. The term "diameter" here refers to the number of routing hops the packet must make to traverse a path between the originating source and the destination. As TTL is decremented on each hop, one must set TTL high enough to encompass the maximum expected number of hops. This setting is well understood in the art and is not further discussed herein.

One limitation on tunnel 230 is that the maximum transmission unit (MTU) for packets must be set to at least {The MTU of the incoming media, e.g., Ethernet with an MTU of 1500 or 4470 for FDDI in an ISP application} bytes+X, where X is the number of bytes in the UTE header. Because UTI does not provide for packet fragmentation, the IP network must be configured to carry the maximum possible payload packet length plus the UTE header.

One of ordinary skill in the art will appreciate that the UTI method described above may be readily implemented in either hardware, such as the discrete logic and/or application specific integrated circuits (ASICs), or software found in today's routers and switches. Furthermore, software-based embodiments may be in the form of conventional computer instructions, firmware, embedded microcode, or any other means of making computer-readable instructions available to a computer. Implementing either the hardware or software embodiments is well within the skills of those in the field.

Process Flow

Figure 3:
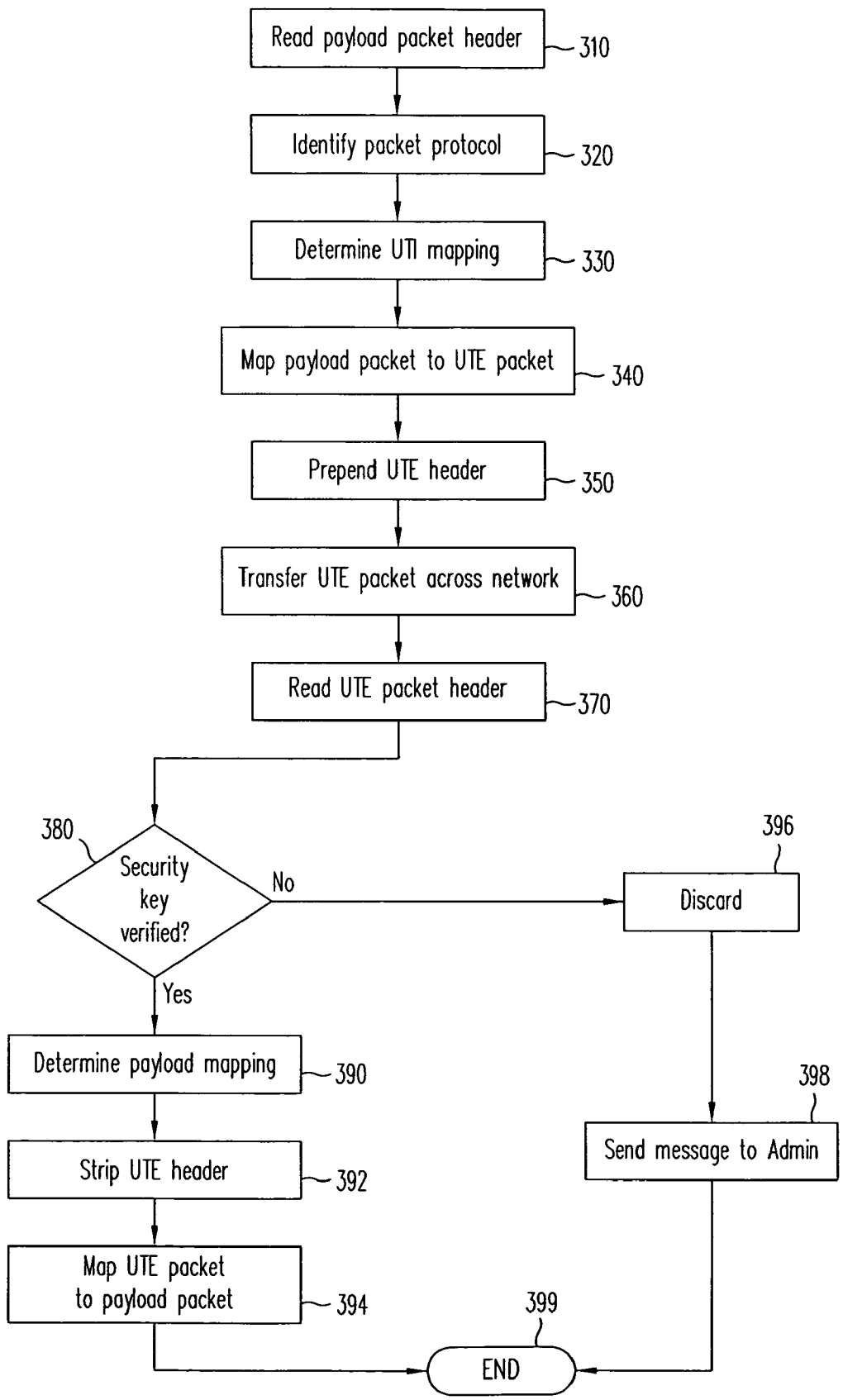
FIG. 3 is a high level block diagram of the method according to one embodiment of the present invention.

The UTI encapsulation process, according to one embodiment of the present invention, is as shown in FIG. 3. The process begins with reading the payload packet header, step 310, to determine its protocol type, e.g. ATM, POS, etc., step 320. The appropriate packet mapping for UTI is next manually determined (i.e., selected by an operator or administrator) in step 330. This mapping defines what needs to be done to the payload packet in order to encapsulate it within the transport packet, according to the UTI protocol. The payload packet is then re-ordered/reformatted as required by the UTI mapping, if necessary, in step 340. In one embodiment of the present invention, no re-ordering or reformatting of the payload packet is required. In such an embodiment, step 340 is omitted.

The UTE header is prepended onto the payload packet in step 350 and the packet is transferred, step 360, across public network 130 (referring to FIG. 2) by means well-known in the art.

At the packet's destination address (egress interface router 220 in FIG. 2), the UTE packet header is read, step 370. The UTI tunnel key is then verified, step 380, against the tunnel key expected from the source (ingress interface) address. If the tunnel key is correct (verified), the payload packet mapping (specifically, the inverse of the UTI mapping of step 330) is selected, step 390, and the UTE header is stripped off, step 392. The UTE packet is then re-ordered/reformatted as required by the selected payload mapping in step 394 and processing of the packet ends, step 399.

In one embodiment of the present invention, the key validation step is accomplished by comparing the transport packet's tunnel key to a key value stored at the egress interface. In an alternate embodiment, the tunnel key is concatenated or otherwise combined with the source tunnel address (STA) (i.e., the network address of the ingress interface) and compared to a table of STA/tunnel key pairs stored at the EI.

In the alternate embodiment discussed above, where no re-ordering or reformatting of the payload packet is required, an inverse re-ordering of the UTE packet is likewise not required. In such an embodiment, step 394 is also omitted.

If, however, the tunnel key does not match the expected value, i.e., the UTE packet security key is not verified in step 380, the entire UTE packet is discarded, step 396, and a message sent to warn the system administrator, step 398, prior to processing termination in step 399.

Although the process flow of FIG. 3 is described, those skilled in the art will realize that process flows other than that shown can be used to achieve the same ends. Accordingly, the invention is not limited to the particular process flow of FIG. 3.

Conclusion

The universal transport encapsulation of the present invention thus enables high-speed IP routing of legacy-format packets without further processing. As discussed in the Background section above, this is especially important when the payload packets are originating on slower legacy networks such as Frame Relay or ATM-based networks.

While particular embodiments of the present invention have been shown and described it will be apparent to those skilled in the art that changes and modifications may be made without departing from this invention in its broader aspect and, therefore, the appended claims are to encompass within their scope all such changes and modification as fall within the true spirit and scope of this invention.

We claim:

1. A computer program product comprising:
a first set of instructions, executable on a computer system, configured to determine a packet protocol for a payload packet;
a second set of instructions, executable on said computer system, configured to select a first mapping function configured to map from said packet protocol to a transport packet protocol, wherein
said selecting is performed using a universal transport interface protocol, and said universal transport interface protocol comprises mapping functions for a plurality of payload packet protocols;
a third set of instructions, executable on said computer system, configured to map a field of said payload packet to a field of a transport packet using said first mapping function;
a fourth set of instructions, executable on said computer system, configured to add overhead information to said transport packet comprising a designation of said packet protocol of the payload packet;
a fifth set of instructions, executable on said computer system, configured to select a second mapping function configured to map from said transport packet protocol to the packet protocol, wherein
said second mapping function comprises one of said first mapping function and an inverse of said first mapping function;
a sixth set of instructions, executable on said computer system, configured to map said transport packet to a second payload packet using said second mapping function; and
computer readable media, wherein the plural sets of instructions are encoded in said computer readable media.

2. The computer program product of claim 1, further comprising:
a seventh set of instructions, executable on said computer system, configured to embed a security key in said transport packet.

3. The computer program product of claim 2, further comprising:
a eighth set of instructions, executable on said computer system, configured to determine said security key.

4. The computer program product of claim 1, wherein said overhead information comprises a payload packet identifier.

5. The computer program product of claim 4, wherein said payload packet identifier designates said packet protocol of said payload packet.

6. The computer program product of claim 4, wherein said payload packet identifier is selected from a plurality of pre-arranged configuration parameters.

7. The computer program product of claim 1, wherein said first mapping function is one of a plurality of predefined mapping functions.

8. The computer program product of claim 7, further comprising:
a seventh set of instructions, executable on said computer system, configured to encapsulate said transport packet using an Internet Protocol encapsulation technique.

9. The computer program product of claim 7, further comprising:
a seventh set of instructions, executable on said computer system, configured to encapsulate said transport packet according to a protocol, wherein
said protocol supports differential handling based on a quality of service parameter.

10. The computer program product of claim 1, further comprising:
a seventh set of instructions, executable on said computer system, configured to verify a security key.

11. The computer program product of claim 10, further comprising:
an eighth set of instructions, executable on said computer system, configured to compare said security key to a stored value.

12. The computer program product of claim 10, further comprising:
an eighth set of instructions, executable on said computer system, configured to discard said transport packet; and
a ninth set of instructions, executable on said computer system, configured to alert an operator if the security key is not verified.

13. An apparatus comprising:
means for determining a packet protocol for a payload packet;
means for selecting a first mapping function configured to map from said packet protocol to a transport packet protocol, wherein said selecting is performed using a universal transport interface protocol, and said universal transport interface protocol comprises mapping functions for a plurality of payload packet protocols;
means for mapping a field of said payload packet to a field of a transport packet using said first mapping function;
means for adding overhead information to said transport packet comprising a designation of said packet protocol of the payload packets;
means for selecting a second mapping function configured to map from said transport packet protocol to the packet protocol, wherein
said second mapping function comprises one of said first mapping function and an inverse of said first mapping function; and
means for mapping said transport packet to a second payload packet using said second mapping function.

14. The apparatus of claim 13, further comprising:
means for embedding a security key in said transport packet.

15. The apparatus of claim 14, further comprising:
means for determining said security key.

16. The apparatus of claim 13, wherein
said overhead information comprises a payload packet identifier.

17. The apparatus of claim 14, wherein
said payload packet identifier designates said packet protocol of said payload packet.

18. The apparatus of claim 16, wherein
said payload packet identifier is selected from a plurality of pre-arranged configuration parameters.

19. The apparatus of claim 13, wherein said first mapping function is one of a plurality of predefined mapping functions.

20. The apparatus of claim 19, further comprising:
means for encapsulating said transport packet using an Internet Protocol encapsulation technique.

21. The apparatus of claim 19, further comprising:
means for encapsulating said transport packet according to a protocol, wherein
said protocol supports differential handling based on a quality of service parameter.

22. The apparatus of claim 13, further comprising:
means for verifying a security key.

23. The apparatus of claim 22, further comprising:
means for comparing said security key to a stored value.

24. The apparatus of claim 22, further comprising:
means for discarding said transport packet and alerting an operator if said verifying fails.

25. An apparatus comprising:
a network device, wherein
said network device is configured to determine a packet protocol for a payload packet;
said network device is configured to select a first mapping function configured to map from said determined packet protocol to a packet transport protocol, wherein
said selecting is performed using a universal transport interface protocol, and said universal transport interface protocol comprises mapping functions for a plurality of payload packet protocols;
said network device is configured to map said payload packet to a transport packet according to said first mapping function;
said network device is configured to add overhead information to said transport packet comprising a designation of said packet protocol of the payload packets;
said network device is configured to select a second mapping function configured to map from said transport packet protocol to the packet protocol, wherein
said second mapping function comprises one of said first mapping function and an inverse of said first mapping function; and
said network device is configured to man said transport packet to a second payload packet using said second mapping function.

26. The apparatus of claim 25, wherein
said overhead information includes a security key.

27. The apparatus of claim 26, wherein
said network device is configured to embed said security key in said transport packet.

28. The apparatus of claim 25, wherein
said first mapping function corresponds to a protocol of said payload packet.

29. The apparatus of claim 28, further comprising:
a set of pre-arranged configuration parameters.

30. The apparatus of claim 29, wherein
said set of pre-arranged configuration parameters comprises a payload packet identifier, wherein
said payload packet identifier designates said protocol of said payload packet.

31. The apparatus of claim 25, further comprising:
a set of predefined encapsulation algorithms, wherein
said set of predefined encapsulation algorithms comprises said first mapping function.

32. The apparatus of claim 31, wherein
said network device is configured to encapsulate said payload packet using an Internet Protocol encapsulation technique.

33. The apparatus of claim 32, wherein
said overhead information comprises a type-of-service field.

34. An apparatus comprising:
a network device, wherein
said network device is configured to determine a packet protocol for a payload packet within a transport packet, wherein
said transport packet conforms to a universal transport interface protocol, and said universal transport interface protocol comprises a mapping function for a plurality payload packet protocols;
said network device is configured to select a transport mapping function configured to map from said transport packet protocol to said packet protocol;
said network device is further configured to map said transport packet to a payload packet using said transport mapping function; and
said transport mapping function comprises one of
a mapping function identical to a payload mapping function configured to map from said packet protocol to said transport packet, and
an inverse of said payload mapping function.

35. The apparatus of claim 34, wherein
said network device is configured to verify a security key.

36. The apparatus of claim 35, wherein
said network device is configured to discard said transport packet and alert an operator if said security key is not verified.

* * * * *

UNITED STATES PATENT AND TRADEMARK OFFICE
CERTIFICATE OF CORRECTION

PATENT NO. : 7,596,146 B2
APPLICATION NO. : 10/958122
DATED : September 29, 2009
INVENTOR(S) : Lothberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Fourteenth Day of December, 2010

David J. Kappos
*Director of the United States Patent and Trademark Office*